United States Patent
Morrison et al.

(10) Patent No.: US 8,166,387 B2
(45) Date of Patent: Apr. 24, 2012

(54) DATAGRID USER INTERFACE CONTROL WITH ROW DETAILS

(75) Inventors: Scott Morrison, Redmond, WA (US); Régis Lucien Francis Brid, Woodinville, WA (US); Yifung Lin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 12/142,979

(22) Filed: Jun. 20, 2008

(65) Prior Publication Data

US 2009/0319882 A1   Dec. 24, 2009

(51) Int. Cl.
G06F 3/048 (2006.01)
(52) U.S. Cl. ........ 715/227; 715/205; 715/212; 715/217; 715/225
(58) Field of Classification Search .......... 715/205, 715/212, 217, 225, 227
See application file for complete search history.

(56) References Cited

U.S. PATENT DOCUMENTS

| | | | |
|---|---|---|---|
| 5,632,009 A * | 5/1997 | Rao et al. ............ | 715/201 |
| 5,768,158 A * | 6/1998 | Adler et al. .......... | 715/209 |
| 6,246,442 B1 * | 6/2001 | Harada et al. ........ | 348/569 |
| 6,857,128 B1 * | 2/2005 | Borden et al. ........ | 725/39 |
| 2002/0186261 A1 * | 12/2002 | Giles et al. .......... | 345/853 |
| 2003/0065671 A1 | 4/2003 | Cardenas | |
| 2003/0188259 A1 * | 10/2003 | Aureglia et al. ...... | 715/503 |
| 2004/0109030 A1 * | 6/2004 | Farrington et al. ..... | 345/808 |
| 2005/0172261 A1 | 8/2005 | Yuknewicz et al. | |
| 2006/0048101 A1 | 3/2006 | Krassovsky et al. | |
| 2006/0117051 A1 * | 6/2006 | Chin ................... | 707/101 |
| 2006/0253280 A1 | 11/2006 | Harband et al. | |
| 2007/0101196 A1 | 5/2007 | Rogers et al. | |
| 2007/0130502 A1 * | 6/2007 | Tolgu et al. ......... | 715/503 |
| 2008/0104091 A1 * | 5/2008 | Chin ................... | 707/100 |
| 2008/0244379 A1 * | 10/2008 | Busse et al. ......... | 715/227 |
| 2008/0306894 A1 * | 12/2008 | Rajkumar et al. ..... | 706/47 |
| 2009/0031208 A1 * | 1/2009 | Robinson ............. | 715/227 |

OTHER PUBLICATIONS

Rashid, "Customising the DataGrid Pager in ASP.NET", 2005, Munsifali Rashid, pp. 4.
"DataGridRowDetailsVisibility Enumeration", Microsoft Corporation, 2008, p. 1.
Wilburn, "Showing and Hiding Details in a Datagrid Row", 2003, George Wilburn, pp. 3.
Mitchell, "An Extensive Examination of the DataGrid Web Control: Part 14", Apr. 2, 2003, Jupitermedia Corporation, pp. 5.
McCook, "Calling a Detail Data Form from a Datagrid Row", 2002, Tech Target, pp. 6.
Kilgo, "Embedding a Detail DataGrid Inside a Master DataGrid . . .", Apr. 27, 2003, DotNetJohn.com LLC., pp. 5.

(Continued)

*Primary Examiner* — Stephen Hong
*Assistant Examiner* — Marshon Robinson
(74) *Attorney, Agent, or Firm* — Hope Baldauff Hartman, LLC

(57) ABSTRACT

A DataGrid user interface (UI) control is presented that is configured to display a table that includes columns corresponding to fields in a data source and rows corresponding to records in the data source. The DataGrid UI control is also configured to display a details section associated with each row in the table. One or all of the details sections can be displayed or hidden based upon properties specified by a developer or input made by a user. A property may also be set to cause the details section for a row to be displayed only when a user interface cursor is hovering over the row associated with the details section. A property may also be set to cause a details section for a row to be displayed only when the associated row is selected.

8 Claims, 10 Drawing Sheets

OTHER PUBLICATIONS

"How to Put a Databound Combobox in a Column of a Datagrid", retrieved at <<http://www.akadia.com/services/dotnet_combobox_in_datagrid.html>>, pp. 13.

"How to Put a Databound Combobox in a Column of a Datagrid", downloaded Apr. 23, 2008 from http://www.akadia.com/services/dotnet_combobox_in_datagrid.htm, 13 Pages.

* cited by examiner

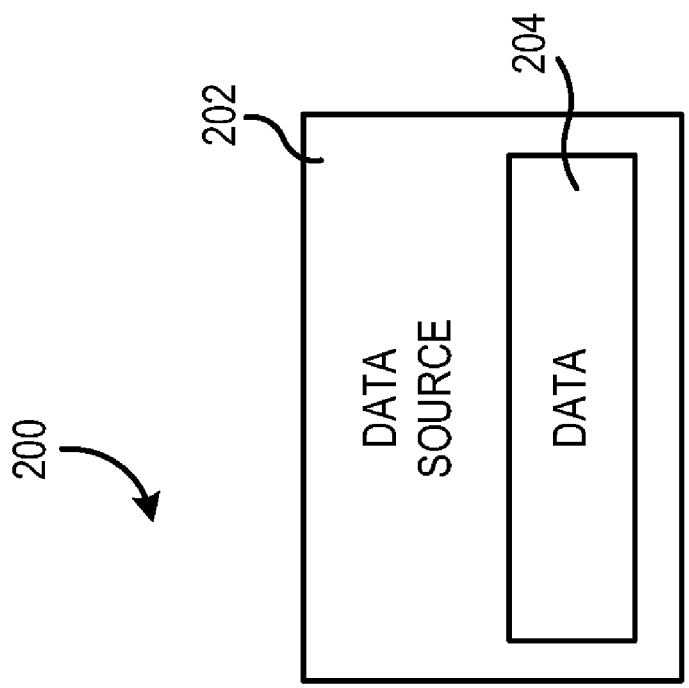
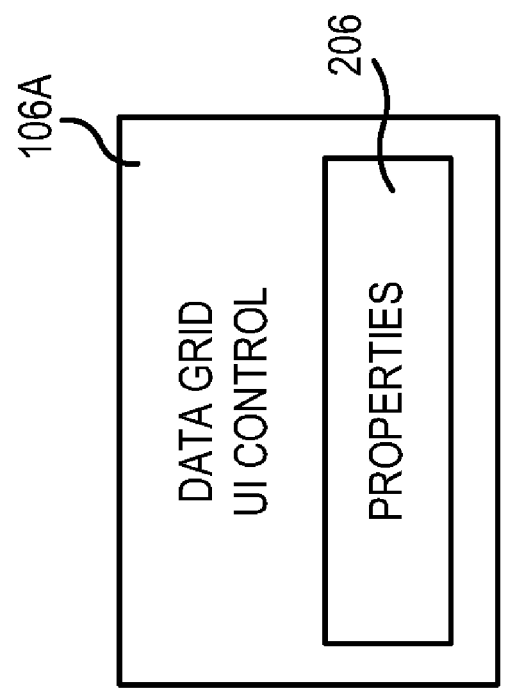
Fig. 2

| RATING | FIRST NAME | LAST NAME | ADDRESS |
|---|---|---|---|
| ☆☆☆ | BOB | SMITH | 1234 MAIN ST. |
| ☆☆☆☆ | SUSAN | JONES | 521 BOULEVARD |
| SUSAN IS A GREAT ASSET. SHE HANDLES WORK GIVEN TO HER QUICKLY AND CONFIDENTLY. | | | |
| ☆☆ | JEFF | BROWN | 432 ACORN DR. |
| ☆☆☆ | STEVE | KING | 543 SMALL RD. |

*Fig. 5A*

| | 302A | 302B | 302C | 302D |
|---|---|---|---|---|
| | RATING | FIRST NAME | LAST NAME | ADDRESS |
| 304A | | | | |
| 304B | ★★☆ | BOB | SMITH | 1234 MAIN ST. |
| 304C | ★★★ | SUSAN ⌐502 | JONES | 521 BOULEVARD |
| 306C | PLEASE NOTIFY HUMAN RESOURCES AFTER CHANGING ANY EMPLOYEE INFO. | | | |
| 304D | ☆ | JEFF | BROWN | 432 ACORN DR. |
| 304E | ★★☆ | STEVE | KING | 543 SMALL RD. |

| RATING | FIRST NAME | LAST NAME | ADDRESS |
|---|---|---|---|
| ☆☆☆ | BOB | SMITH | 1234 MAIN ST. |
| BOB IS DOING GOOD. COULD USE SOME IMPROVEMENT. | | | |
| ☆☆☆☆ | SUSAN | JONES | 521 BOULEVARD |
| SUSAN IS A GREAT ASSET. SUE HANDLES WORK GIVEN TO HER QUICKLY AND CONFIDENTLY. | | | |
| ☆ | JEFF | BROWN | 432 ACORN DR. |
| JEFF NEEDS IMPROVEMENT. | | | |
| ☆☆ | STEVE | KING | 543 SMALL RD. |
| STEVE'S WORK PRODUCT IS INCONSISTENT. HE DOES HAVE THE POTENTIAL TO BE A GREAT EMPLOYEE. | | | |

*Fig. 7*

DATAGRID USER INTERFACE CONTROL WITH ROW DETAILS

BACKGROUND

A DataGrid user interface ("UI") control provides functionality for retrieving data from a database or other data source and displaying the data in a table. Columns in the table generally correspond to fields in the data source and rows in the table generally correspond to records in the data source. A DataGrid UI control may also provide functionality for allowing a user to select, sort, and edit the data presented by the control.

Developers using DataGrid UI controls frequently want to be able to display additional information about a data item that does not fit within the cell structure of a DataGrid row. For instance, a developer may desire to display a second table with a master details relationship, a field that contains a long string of text that does not fit well into a single cell, or a graphical representation of the data contained in a row. Previously, placing such data within a DataGrid UI control was difficult or even impossible. As a result, many developers utilized a separate UI control outside of the DataGrid UI control to display the ancillary information. However, the use of a second UI control in addition to a DataGrid UI control in this manner may be difficult and may not be visually appealing.

It is with respect to these considerations and others that the disclosure made herein is presented.

SUMMARY

An improved DataGrid UI control is presented herein. According to embodiments, the DataGrid UI control provides functionality for displaying additional information about a data item inline in the DataGrid UI control. Because the additional information is displayed within the DataGrid UI control itself, the need to utilize a second UI control to display this information is eliminated.

The DataGrid UI control provided herein is configured to display a table that includes columns that correspond to fields in a data source and rows that correspond to records in the data source. The DataGrid UI control presented herein is also configured to display a details section associated with one or more rows in the table. In one embodiment, the details section is displayed just below and adjacent to an associated row. The details section may be utilized to display any type of data. The data shown in the details section is typically associated with the record in the data source referenced by the associated row in the table.

According to other aspects, the DataGrid UI control presented herein also includes functionality for displaying or hiding one or all of the details sections according to properties specified by a developer or input made by a user. For instance, a developer may set properties on the DataGrid UI control to cause all of the details sections in the table to be displayed or to not be displayed ("hidden"). A developer may similarly set properties on the DataGrid UI control to cause the details section for one row in the table to be displayed or to be hidden. As used herein, the term hidden refers to removing the display of one or more of the details sections such that the details sections are not visible and do not take up any space on screen.

According to other aspects, a developer may set properties on the DataGrid UI control to cause the details section for a row to be displayed only when a user interface cursor, such as a mouse cursor, is hovering over the row associated with the details section. Similarly, a developer may set properties on the DataGrid UI control to cause a details section for a row to be displayed only when the associated row is selected. If another row is selected, the details section will be hidden and the details section for the newly selected row will be displayed. In embodiments, the displaying and hiding of the details sections may be performed in an animated manner.

According to another aspect, a developer may specify data to be displayed in the details sections when the table is in viewing mode and other data that is to be displayed in the details section when the contents of the table are being edited. For instance, when a request is received to edit a row in the table, data specified for display during editing may be displayed in the details section associated with the row that is being edited.

It should be appreciated that the above-described subject matter might also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a software architecture diagram showing aspects of a DataGrid UI control provided in one embodiment disclosed herein;

FIGS. 3-5B are screen display diagrams showing various screen displays generated by a DataGrid UI control in various embodiments presented herein;

FIG. 7 is a screen display diagram showing one screen display generated by a DataGrid UI control in one embodiment presented herein;

DETAILED DESCRIPTION

Figure 1:
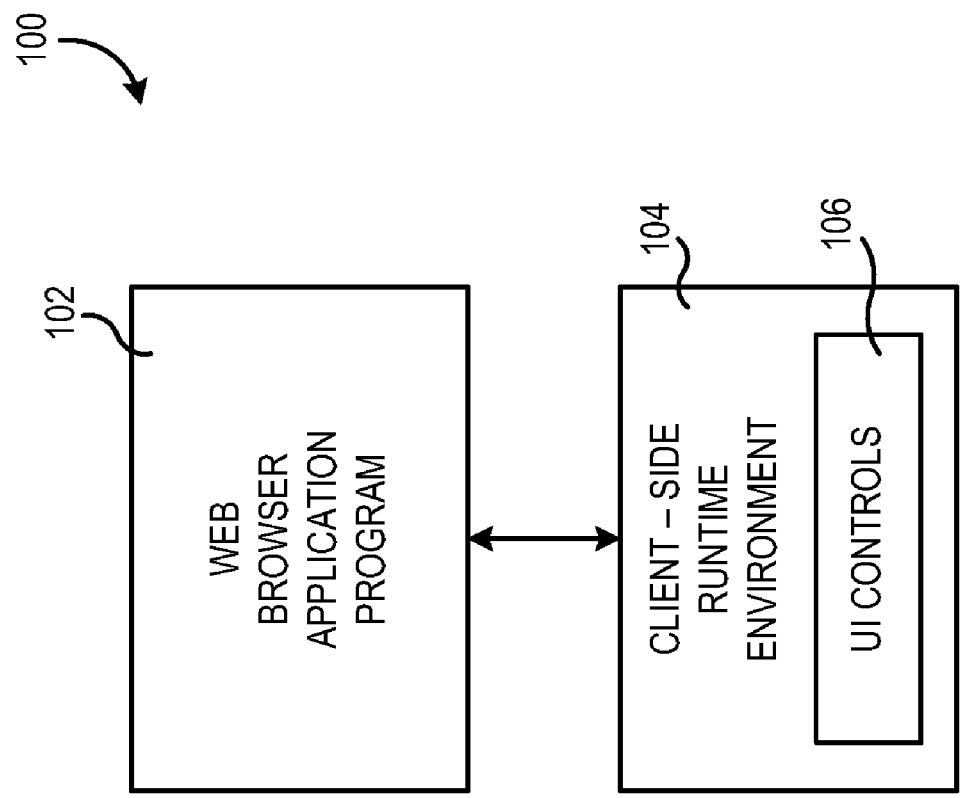
FIG. 1 is a software architecture diagram showing one operating environment for the embodiments presented herein.

The following detailed description is directed to technologies for providing an improved DataGrid UI control. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a DataGrid UI control will be described.

Turning now to FIG. 1, details will be provided regarding an illustrative operating environment for the embodiments presented herein. In particular, one illustrative operating environment for the DataGrid UI control disclosed herein is provided by a client-side runtime environment 104. The client-side runtime environment 104 provides one or more UI controls 106 that may be instantiated through program code provided to the client-side runtime environment 104. When the client-side runtime environment 104 executes the code, it is configured to present a display of the UI controls 106 within a web browser application program 102. Through the functionality provided by the web browser application program 102 and the operating system upon which it is executed, a user can interact with the UI controls 106 to perform various functions.

According to one implementation, the client-side runtime environment 104 comprises the SILVERLIGHT client-side runtime environment from MICROSOFT CORPORATION of Redmond, Wash. It should be appreciated, however, that the DataGrid UI control presented herein may be implemented by other types of client-side runtime environments from other venders. For instance, the DataGrid UI control described herein may be implemented within the FLASH client-side runtime environment from ADOBE CORPORATION, the SHOCKWAVE client-side runtime environment, also from ADOBE CORPORATION, the QUICKTIME environment from APPLE INC., and within others.

It should also be appreciated that the implementation of the DataGrid UI Control presented herein is not limited to a client-side runtime environment. Rather, the DataGrid UI control presented herein may be implemented by a server-side environment, such as the ASP.NET web application framework developed and marketed by MICROSOFT CORPORATION. It should be further appreciated that the DataGrid UI control presented herein may also be implemented and provided by an operating system or a program that executes in conjunction with an operating system to provide UI controls for use by application programs executing on the operating system. The DataGrid UI control presented herein may also be directly implemented within an application program. Other environments for implementation and execution of the DataGrid UI control presented herein will be appreciated by those skilled in the art.

Referring now to FIG. 2, additional details will be provided regarding the DataGrid UI control 106A presented herein. As illustrated in FIG. 2, the DataGrid UI control 106A is configured to retrieve data 204 from a data source 202. In one embodiment the data source 202 is a database. It should be appreciated, however, that the data source 202 may comprise any type of service, application, object, or construct that can provide data that may be formatted and displayed within a table. The data source 202 from which the DataGrid UI control 106A retrieves the data 204 is specified as one of the properties 206 of the DataGrid UI control 106A.

As will be discussed in greater detail below, when the DataGrid UI control 106A is instantiated, the DataGrid UI control 106A connects to the data source 202 and retrieves the data 204. The data 204 retrieved from the data source 202 is displayed in a table that includes columns corresponding to fields within the data source 202 and rows that corresponds to records within the data source 202. As will also be described in greater detail below, the properties 206 may be specified to control the manner in which the table presented by the DataGrid UI control 106 is displayed. The properties 206 may also be specified to control the manner in which details sections presented within the table are displayed. As will be discussed in greater detail below, details sections are cells within the table that allow for the display of additional information about data in a row of the table. Additional details regarding the details sections and their implementation and use will be provided below with respect to FIGS. 3-9.

Figure 3:
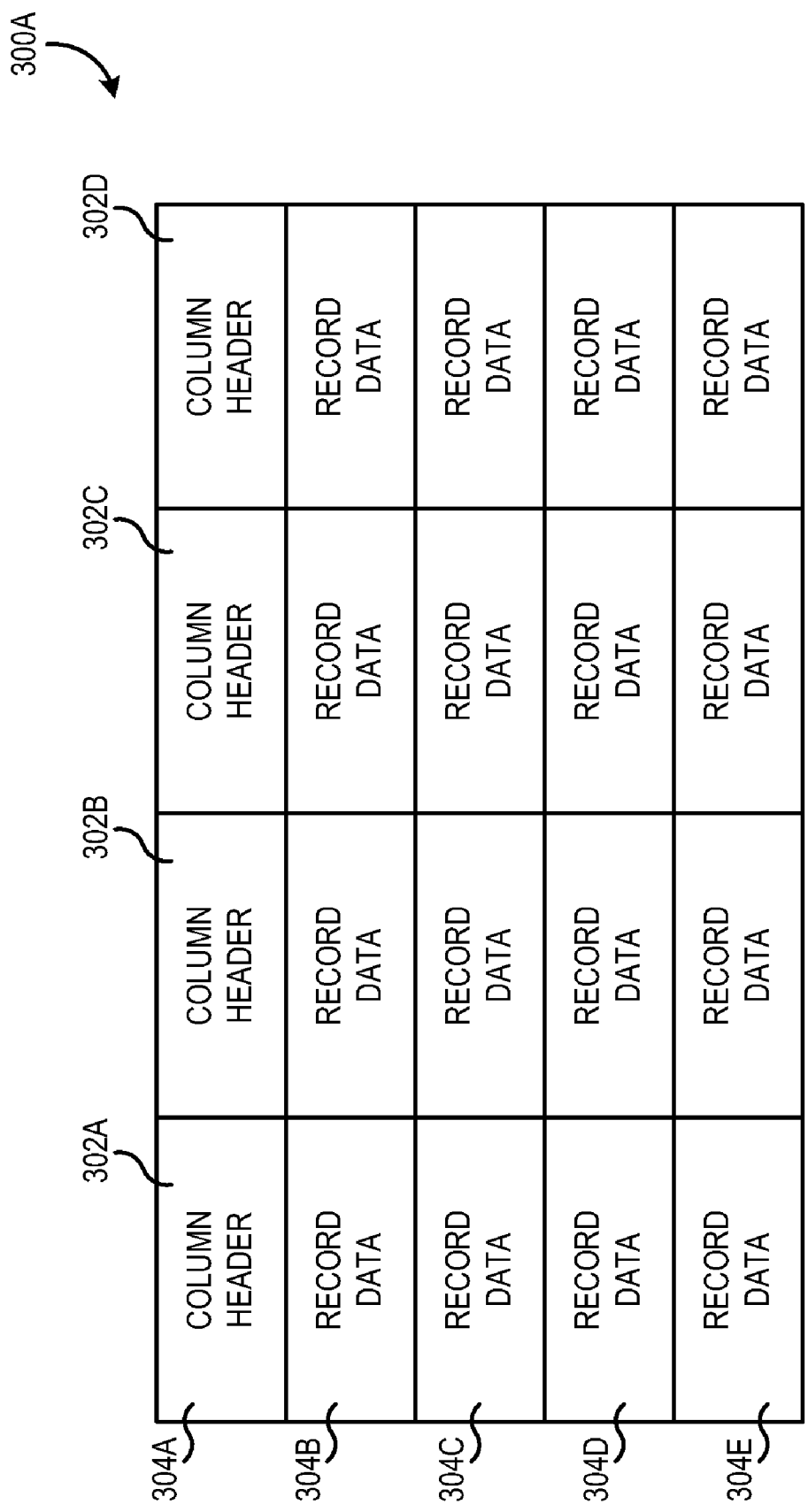

Referring now to FIG. 3, additional details will be provided regarding the screen display generated by the DataGrid UI control 106A. As discussed briefly above, when the DataGrid UI control 106A is instantiated, it generates a table 300A that includes one or more columns 302A-302D and one or more rows 304A-304E. As also discussed briefly above, the columns 302A-302D correspond to fields in the data source 202. The rows 304A-304E correspond to records in the data source 202. As illustrated in FIG. 3, one of the rows 304A may be reserved for displaying column headers for the columns 302A-302D. One of the columns may also be reserved for displaying row headers (not shown in FIG. 3).

As described above with respect to FIG. 2, the DataGrid UI control 106A connects to the data source 202 and retrieves the data 204. The data is then displayed within the table 300A. The data presented in the table may be selected, sorted, and edited by a user. Properties may also be specified on the DataGrid UI control 106A to control the manner in which the data presented therein may be selected, sorted, or edited. Other properties may also be specified for configuring the various visual aspects of the table 300A displayed by the DataGrid UI control 106A.

Figure 4:
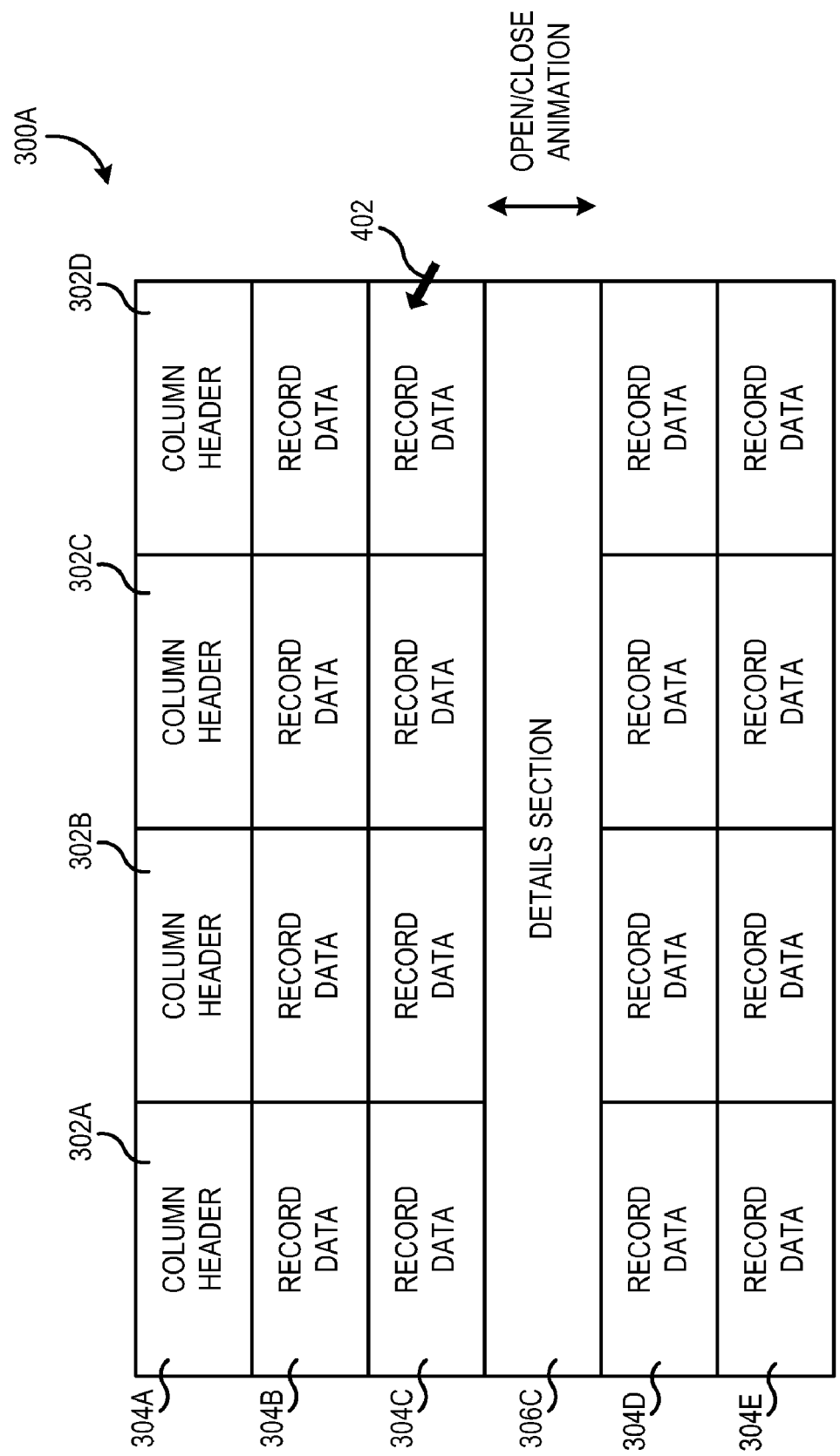

Turing now to FIG. 4, additional details will be described regarding the functionality provided by the DataGrid UI control 106 for displaying additional details for each row 304B-304E in the table 300A. According to one embodiment, content can be specified for display in details sections associated with each of the rows 304B-304E. In the illustrative example shown in FIG. 4, a details section 306C has been displayed in the table 300A. The details section 306C corresponds to the row 304C.

According to one implementation, the details section 306C is a cell in the table 300A that has a width equal to the width of the table 300A and that is positioned adjacent to the corresponding row. In the example shown in the table 300A illustrated in FIG. 4, the details section 306C is displayed adjacent to and below the corresponding row 304C. Other details sections for other rows may be displayed in a similar manner. For instance, a details section for the row 304E would be displayed below and adjacent to this row.

Through the use of the properties 206, the content to be displayed in the details sections 306 of the table 300A can be specified. In one embodiment, the data presented in each details section 306 is data that is related to the data shown in the corresponding row. It should be appreciated, however, that any arbitrary data may be displayed in the details sections 306. It should also be appreciated that any type of data may be displayed in the details sections 306, including but not limited to text data, graphics, multi media content, images, other tables, or any other data that may be presented on a display screen.

As will be described in greater below, the properties 206 may also be utilized to specify the manner in which the details sections 306 are displayed or hidden. For instance, in one implementation, a property may be specified indicating that all of the details sections should be hidden. Alternatively, a property may be specified indicating that all of the details sections 306 should be displayed. Another property may be specified indicating that one of the details sections 306 should be displayed or hidden.

As will also be described in greater detail below, other properties may be specified indicating that the details sections 306 are to be displayed only when a selection is received of one of the rows 304B-304E. For instance, in response to the selection of the row 304C with an appropriate user input mechanism, such as the mouse cursor 402, the details section 306C may be displayed. In another embodiment, a property may be specified indicating that a details section for a row is displayed when a user input cursor is hovered over the corresponding row. For example, in the table 300A illustrated in FIG. 4, the mouse cursor 402 may be hovered over the row 304C without actually selecting the row 304C. If the above described property has been set, the details section 306C will be displayed while the mouse cursor 402 is hovered over the row 304C. Additional details regarding the configuration and use of these properties will be provided in greater detail below.

According to one implementation, the display or removal of the display of each details section may be performed in an animated manner. For instance, an animation may be displayed that causes the details section to gradually appear from the bottom of the row to which it corresponds. A similar animation may be performed when the details section 306 is hidden. Other types of animations may also be performed when a details section 306 is displayed or hidden. For instance, the details section 306 may be visually faded in or out using a transparency effect. Other types of animations will be apparent to those skilled in the art.

Referring now to FIG. 5A, an illustrative table 300B generated by the DataGrid UI control 106A will be described. In this example, the table 300B is generated by the DataGrid UI control 106A based upon a data source 202 that includes employee information. In particular, the column 302A is used for displaying an employee rating field, the column 302B is utilized for displaying a first name field, the column 302C is utilized for displaying a last name field, and the column 302D is utilized for displaying an address field. As discussed above, the rows 304B-304E are utilized for displaying records in the data source 202. In this case, the records correspond to employees and information related to the employees.

The illustrative table 300B shown in FIG. 5A also includes a details section 306C. The details section 306C corresponds to the row 304C. In this case, the details section 306C is being utilized to display additional information regarding the employee referenced by the row 304C names "Susan."

In the illustrative table 300B shown in FIG. 5A, only the details section 306C is being displayed. Details sections corresponding to the rows 304B, 304D, and 304E are hidden. In order to generate the table 300B shown in FIG. 5A, a developer may specify one of the properties 206 to cause the table 300B to be generated with all of the details sections 306 hidden. The developer may then specify a separate property to indicate that the details section 306C should be displayed. Alternately, as described above, the details section 306C may be displayed in response to the selection of the row 304C or in response to a user input cursor hovering over the row 304C. Additional details regarding the properties 206 will be provided below with respect to FIG. 6.

Referring now to FIG. 5B, additional details regarding the functionality provided by the DataGrid UI control 106A for displaying alternative content in the details section 306C when the contents of the table 300A are being edited will be described. As discussed briefly above, the DataGrid UI control 106A provides functionality for allowing a user to edit data displayed within the table 300A. In this regard, a developer can specify alternative content that should be displayed in a details section 306 when a user is editing the data contained within the table 300A. For instance, in the example shown in FIG. 5B, a user has requested to edit the contents of the table 300A by placing an insertion point 502 into the row 304C. In response thereto, the DataGrid UI control 106A has identified content specified for display during editing of the row 304C and displayed this content in the details section 306C corresponding thereto. It should be appreciated that content to be displayed for editing may be specified for any of the details sections 306 within the table 300A. Additional details regarding how this content is specified in one embodiment is provided below with respect to FIG. 6.

Figure 6:
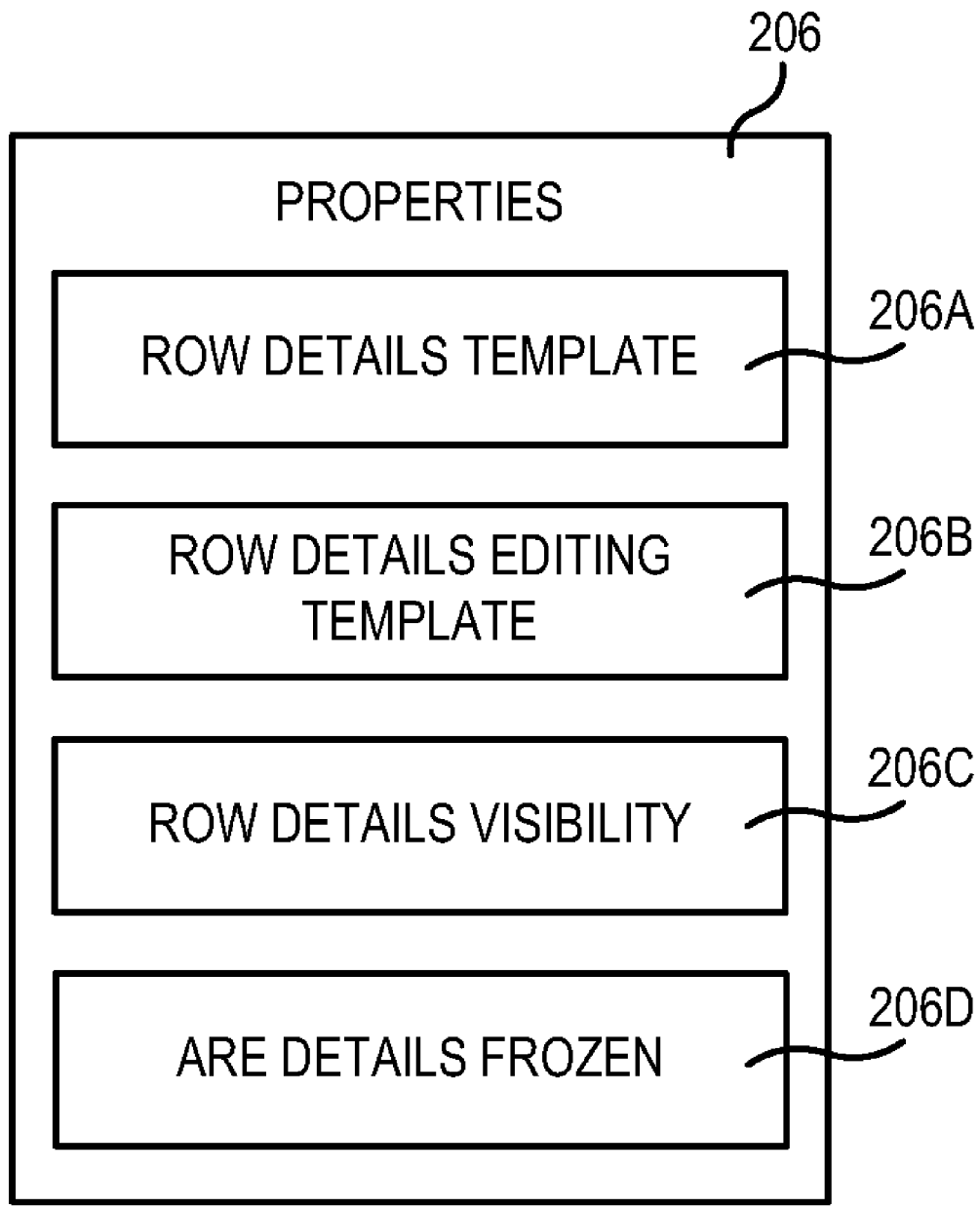
FIG. 6 is a software architecture diagram showing several properties that may be set on a DataGrid UI control provided herein in one embodiment.

Referring now to FIG. 6, additional details regarding the properties 206 that may be utilized to specify the behavior of the DataGrid UI control 106A will be described. As shown in FIG. 6, a row details template property 206A may be specified that identifies a data template that defines how the data should be displayed in the details sections 306. For instance, one data template might include a text box that displays decimal data similar to the manner in which a calculator would display this data. Another data template might display the same data using a circular pie chart. Other types of data templates may also be utilized.

A row details editing template property 206B may also be specified that identifies content that should be displayed in the details sections when the data in the table 300 is being edited. For instance, in response to a request to edit the contents of the table 300, the data specified by the row details editing template property 206B will be shown in the details sections. In this manner, different content may be displayed while the table 300 is being edited. Additional details regarding this process were provided above with respect to FIG. 5B.

As also illustrated in FIG. 6, a row details visibility property 206C may be specified. The row details visibility property 206C can be used to indicate that the details section for a specified row should be visible or hidden. In this manner, a developer can selectively display or hide one of the details sections 306. As discussed above, the row details visibility property 206C may also be used to specify the manner in which all of the details sections 306 in the table 300 are displayed. For instance, in one implementation, the row details visibility property 206C can be set to cause all of the details sections 306 in the table 300 to be displayed. FIG. 7 illustrates the table 300B with all of the details sections 306B-306E displayed for the rows 304B-304E, respectively. Alternatively, the row details visibility property 206C may be set such that all of the details sections 306 of the table 300 are hidden. In this manner, the table 300A can be displayed as shown in FIG. 3.

As also discussed briefly above, the row details visibility property 206C may also be specified such that the details section for any row should be displayed only when the user interface cursor 402 hovers over a row. Alternatively, the row details visibility property 206C may be specified such that the details section for a row is visible only when the corresponding row is selected utilizing an appropriate user input mechanism. When the row details visibility property 206C is set in this manner, the DataGrid UI control 106A is configured to determine whether the user interface cursor 402 is hovering over a row or whether a row has been otherwise selected. In response to receiving such input, the DataGrid UI control 106A will appropriately hide or display the details section corresponding to the selected row or the row over which the user input cursor 402 is hovering.

According to one implementation, an "are details frozen" property 206D may also be specified on the DataGrid UI control 106A. This property allows the developer to choose whether the details sections 306 should be displayed as wide as all of the columns 302A-302D within a row 304 and whether it scrolls. Alternatively, the developer may specify that the details sections 306 are only as wide as the displayed columns area of the table 300A and do not scroll.

Figure 8:
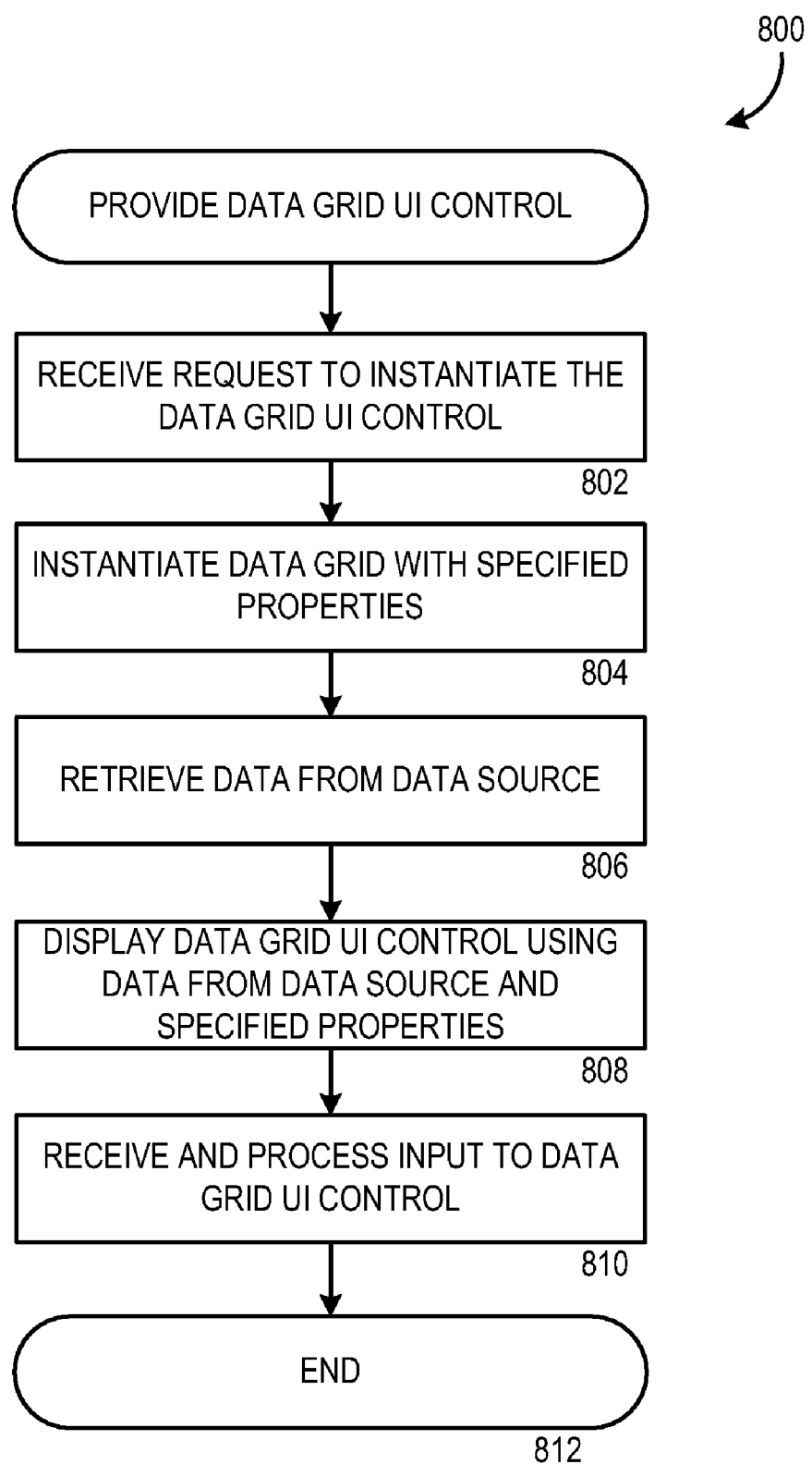
FIG. 8 is a flow diagram showing an illustrative process for providing a DataGrid UI control in one embodiment presented herein.

Referring now to FIG. 8, a flow diagram 800 will be described that illustrates one process for providing an improved DataGrid UI control 106A. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 800 begins at operation 802, where a request is received to instantiate the DataGrid UI control 106A. For instance, in the illustrative operating environment shown in FIG. 1 and described above, the web browser application program 102 may be utilized to load a web page that includes program code for instantiating the DataGrid UI control 106A. As also discussed above, the program code may specify the row details template property 206A, the row details template property 206B, and the row details visibility property 206C or the details visibility mode property 206D. The program code also identifies the data source 202 from which the DataGrid UI control 106 should retrieve the data 204.

From operation 802, the routine 800 continues to operation 804 where the DataGrid UI control 106A is instantiated utilizing the specified properties 206. Once instantiated, the routine 800 proceeds to operation 806, where the DataGrid UI control 106A retrieves the data 204 from the data source 202.

From operation 806, the routine 800 proceeds to operation 808, where the DataGrid UI control 106 builds and formats the table 300 utilizing the data retrieved from the data source 204. The DataGrid UI control 106A also utilizes the properties 206 to determine how the data 204 should be displayed and how the details sections 306 should be displayed or hidden.

Once the table 300 has been displayed, the routine 800 proceeds to operation 810 where the DataGrid UI control 106A receives and processes input made to the table 300. For instance, as discussed above, depending on the value of the properties 206, the selection of a row 304 may cause a details section 306 for that row to be displayed. Alternatively, receiving an indication that the user input cursor 402 is hovering over a row 304 may cause the details section associated with that row to be displayed. Similarly, a request to edit the data displayed in the table 300A may cause the contents of the details section to be displayed utilizing the data specified through the row details editing template property 206B. The DataGrid UI control 106A continues processing user input in this manner until the user has completed their use of the DataGrid UI control 106A. Once the use has been discontinued, the routine 800 proceeds to operation 812, where it ends.

Figure 9:
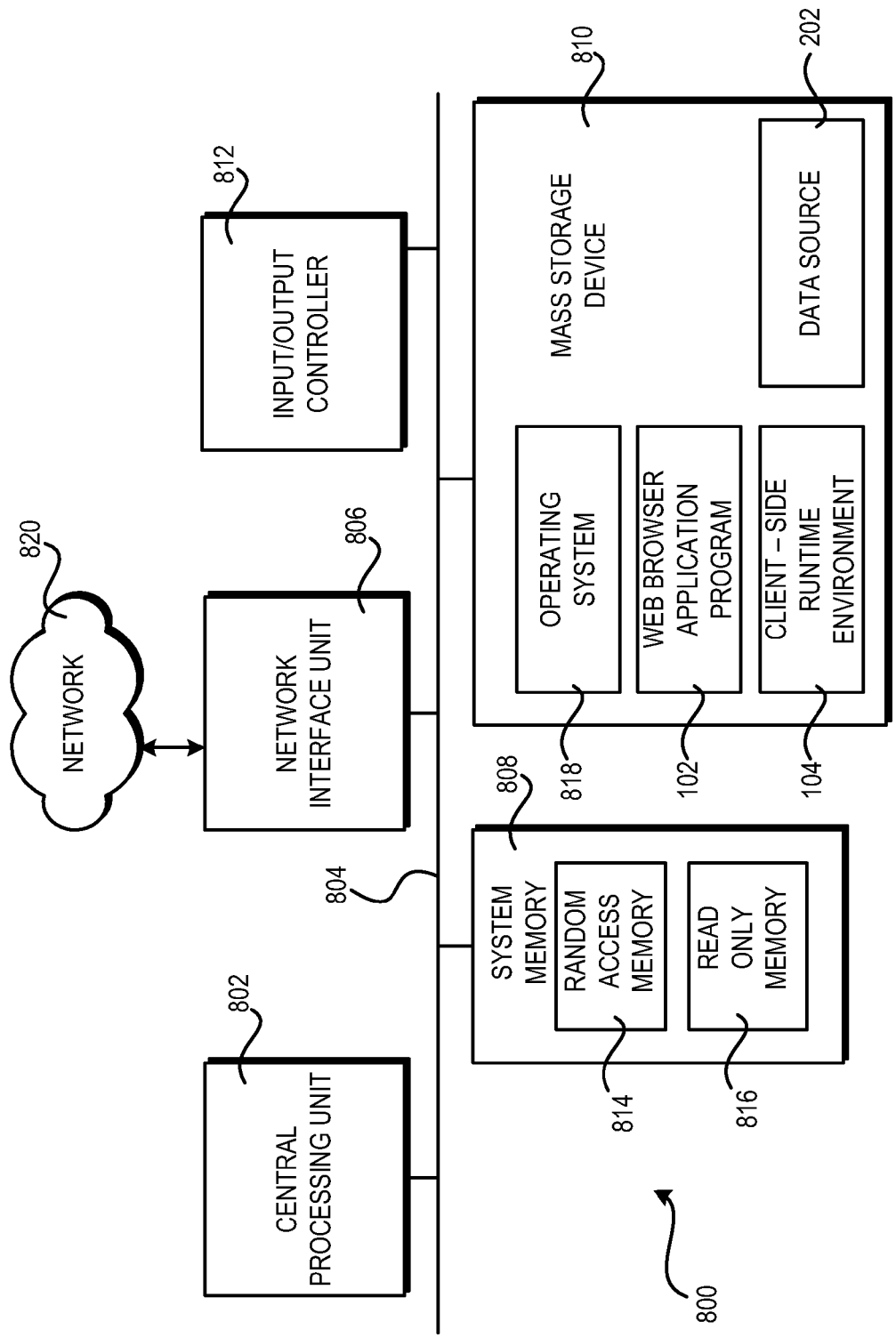
FIG. 9 is a computer architecture diagram showing an illustrative computer hardware and software architecture for a computing system capable of implementing aspects of the embodiments presented herein.

FIG. 9 shows an illustrative computer architecture for a computer 900 capable of executing the software components described herein for providing the DataGrid UI control 106A in the manner presented above. The computer architecture shown in FIG. 9 illustrates a conventional desktop, laptop, or server computer and may be utilized to execute any aspects of the software components presented herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer 900, such as during startup, is stored in the ROM 916. The computer 900 further includes a mass storage device 910 for storing an operating system 918, application programs, and other program modules, which are described in greater detail herein.

The mass storage device 910 is connected to the CPU 902 through a mass storage controller (not shown) connected to the bus 904. The mass storage device 910 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable media can be any available computer storage media that can be accessed by the computer 900.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 918 suitable for controlling the operation of a networked desktop, laptop, or server computer. The mass storage device 910 and RAM 914 may also store one or more program modules. In particular, the mass storage device 910 and the RAM 914 may store the web browser application program 102, the client-side runtime environment 104, and the data source 202, each of which was described in detail above with respect to FIGS. 1-8. The mass storage device 910 and the RAM 914 may also store other types of program modules and data.

Based on the foregoing, it should be appreciated that technologies for providing an improved DataGrid UI control 106A are disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a DataGrid user interface control, the method comprising:
   displaying a table comprising one or more columns corresponding to fields in a data source and one or more rows corresponding to records in the data source; and
   displaying one or more details sections comprising cells in the table having a width equal to a width of the table, each of the details sections corresponding to a row in the table, being positioned adjacent to the corresponding row, and containing data associated with the corresponding row;
   setting values for one or more properties of the DataGrid user interface control, the properties specifying whether the details section for a specified row should be visible, whether the details section for a specified row should not be visible, whether the details section for every row in the DataGrid user interface should be visible, whether no details section for any row in the DataGrid user interface should be visible, whether the details section for a row should be displayed only when a user interface cursor hovers over a corresponding row, and whether the details section for a row should be visible only when the corresponding row is selected; and
   displaying and hiding the one or more details sections of the DataGrid user interface control according to the values set for the properties of the DataGrid user interface control.

2. The method of claim 1, further comprising:
   receiving a request to edit data in a row of the table; and
   in response to receiving the request to edit the table, displaying data specified by one or more additional properties of the DataGrid user interface control for display during editing in the details section of the row to be edited.

3. The method of claim 1, wherein displaying the details section comprises displaying the details section in an animated fashion and wherein hiding the details section comprises removing the details section in an animated manner.

4. A computer storage medium having computer executable instructions stored thereon which, when executed by a computer, cause the computer to:
   receive a request to display a DataGrid user interface (UI) control with a details section for one or more rows in the DataGrid UI control, the request specifying one or more properties indicating whether one details section should be visible or hidden, whether all of the details sections should be visible or hidden, whether the details sections should be displayed only when a user interface cursor hovers over a corresponding row, and whether the details sections should be visible only when a corresponding row is selected; and to
   display the DataGrid UI control in response to the request, the DataGrid UI control comprising a table having one or more columns corresponding to fields in a data source, one or more rows corresponding to records in the data source, and one or more details sections each corresponding to a row in the table, containing data associated with the corresponding row, and being displayed or hidden according to values specified for the properties.

5. The computer storage medium of claim 4, wherein each details section comprises a cell in the table having a width equal to a width of the table and being positioned adjacent to the corresponding row.

6. The computer storage medium of claim 4, wherein one of the properties comprises a property for specifying data that should be displayed in the details sections when data in the DataGrid UI control is being edited.

7. The computer storage medium of claim 6, wherein the details sections are displayed and hidden in an animated manner.

8. A method for providing a DataGrid user interface control, the method comprising:
   receiving a request to display a DataGrid user interface (UI) control having a details section for one or more rows in the DataGrid UI control, the request specifying a value for a property indicating whether each of the details sections should be displayed or hidden, whether the details sections should be visible only when a corresponding row is selected, or that the details sections should be displayed only when a user interface cursor hovers over a corresponding row;
   in response to receiving the request, displaying the DataGrid UI control, the DataGrid UI control comprising a table having one or more columns corresponding to fields in a data source, one or more rows corresponding to records in the data source, and the details sections each corresponding to and being displayed adjacent to a row in the table and containing data associated with the corresponding row; and
   displaying or hiding the details sections in the DataGrid UI control in an animated manner according to the value specified for the property.

* * * * *